United States Patent [19]
Cameron

[11] Patent Number: 5,455,885
[45] Date of Patent: Oct. 3, 1995

[54] METHOD AND APPARATUS FOR STARTING A SENSORLESS POLYPHASE DC MOTOR IN DUAL-COIL MODE AND SWITCHING TO SINGLE COIL MODE AT SPEED

[75] Inventor: Scott W. Cameron, Milpitas, Calif.

[73] Assignee: SGS-Thomson Microelectronics, Inc., Carrollton, Tex.

[21] Appl. No.: 387,386

[22] Filed: Feb. 13, 1995

Related U.S. Application Data

[63] Continuation of Ser. No. 123,347, Sep. 17, 1993, abandoned, which is a continuation of Ser. No. 85,507, Jun. 30, 1993.

[51] Int. Cl.$^6$ ..................................................... H02P 7/285
[52] U.S. Cl. ........................... 388/834; 318/771; 318/778; 318/779; 388/808
[58] Field of Search ......................... 318/771, 778, 318/779, 780; 388/834, 808

[56] References Cited

U.S. PATENT DOCUMENTS

| | | | |
|---|---|---|---|
| 2,805,383 | 9/1957 | Harlburt | 318/771 |
| 3,045,166 | 7/1962 | Robinson | 318/771 |
| 3,378,755 | 4/1968 | Sawyer | 318/771 |
| 3,526,816 | 9/1970 | Paice et al. | 318/771 |
| 3,577,929 | 5/1971 | Onoda et al. | 318/771 |
| 3,627,974 | 12/1971 | Normando et al. | 219/131 R |
| 3,636,541 | 1/1972 | Genuit et al. | 340/248 B |
| 3,854,077 | 12/1974 | Greenwell | 318/227 |
| 3,975,668 | 8/1976 | Davie | 318/771 |
| 5,003,241 | 3/1991 | Rowan et al. | 385/808 |
| 5,278,253 | 6/1993 | Morehouse et al. | 310/68 R |
| 5,294,877 | 3/1994 | Cameron | 318/809 |

*Primary Examiner*—William M. Shoop, Jr.
*Assistant Examiner*—Karen Masih
*Attorney, Agent, or Firm*—Richard A. Bachand; Joseph C. Arrambide; Lisa K. Jorgenson

[57] ABSTRACT

A method and apparatus for operating a polyphase dc motor selectively in dual-coil or uni-coil commutation modes. The motor has a plurality of "Y" connected driving coils connected together at a center tap. Each driving coil has an input node at an end opposite the center tap, and is driven by a switch pair. Each switch pair is arranged for connection in series across a power supply voltage, and has a node between each switch connected to a respective one of the coil input nodes. An additional pair of switches are provided for connection in series across the power supply with a connection node between each switch connected to the center tap. A circuit is provided to operate the switches to cause a driving current to be passed between sequentially selected pairs of the driving coils for an initial start-up time. Also, a circuit to operate the switches after the initial start-up time is provided to cause a driving current to be passed between sequentially selected only single ones of the driving coils and the center tap current input node. The apparatus also has a circuit for detecting a zero crossing of a bemf signal of a floating one of the driving coils and a delay circuit for establishing a delay between a zero crossing and a commutation of driving signals to the coils. A circuit operates the delay circuit to provide a first predetermined delay in dual-coil mode and a second predetermined delay in uni-coil mode.

17 Claims, 14 Drawing Sheets

BEGINNING OF PHASE | ROTATION THROUGH MAXIMUM TORQUE POSITION | END OF PHASE

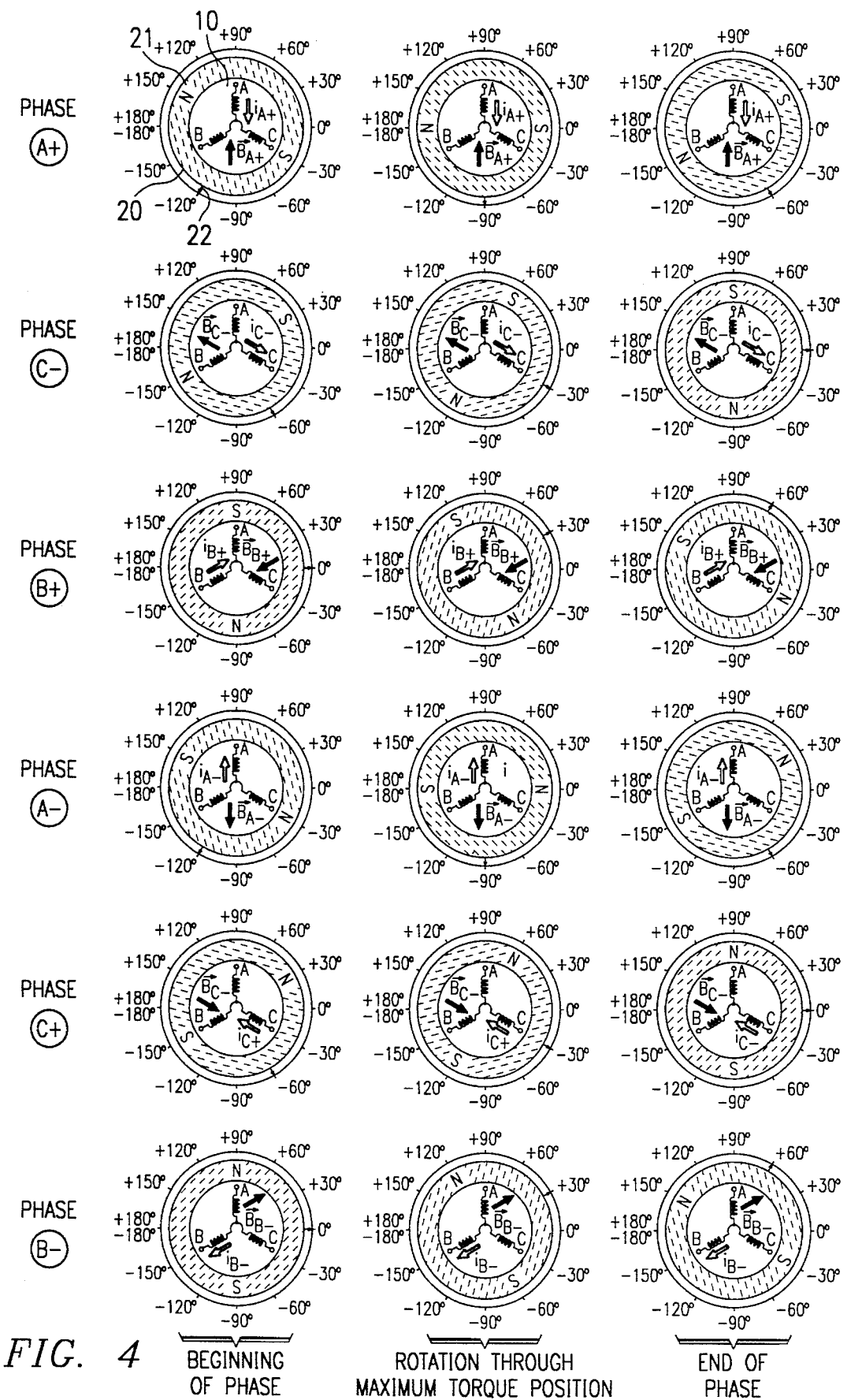
FIG. 4   BEGINNING OF PHASE   ROTATION THROUGH MAXIMUM TORQUE POSITION   END OF PHASE

COMMUTATION LOGIC FOR COMBINED MODES
| | CURRENT FLOWS FROM→TO | FLOATING COIL(S) | uA | IA | uB | IB | uC | IC | uC$_{tap}$ | IC$_{tap}$ | ONE/TWO | |
|---|---|---|---|---|---|---|---|---|---|---|---|---|
| PHASE (A+) | A→C$_{tap}$ | B AND C | 1 | 0 | 0 | 0 | 0 | 0 | 0 | 1 | 0 | |
| PHASE (C-) | C$_{tap}$→C | A AND B | 0 | 0 | 0 | 0 | 0 | 1 | 1 | 0 | 0 | |
| PHASE (B+) | B→C$_{tap}$ | A AND C | 0 | 0 | 1 | 0 | 0 | 0 | 0 | 1 | 0 | ONE COIL MODE |
| PHASE (A-) | C$_{tap}$→A | B AND C | 0 | 1 | 0 | 0 | 0 | 0 | 1 | 0 | 0 | |
| PHASE (C+) | C→C$_{tap}$ | A AND B | 0 | 0 | 0 | 0 | 1 | 0 | 0 | 1 | 0 | |
| PHASE (B-) | C$_{tap}$→B | A AND C | 0 | 0 | 0 | 1 | 0 | 0 | 1 | 0 | 0 | |
| PHASE (1) | A→B | C | 1 | 0 | 0 | 1 | 0 | 0 | 0 | 0 | 1 | |
| PHASE (2) | A→C | B | 1 | 0 | 0 | 0 | 0 | 1 | 0 | 0 | 1 | |
| PHASE (3) | B→C | A | 0 | 0 | 1 | 0 | 0 | 1 | 0 | 0 | 1 | DUAL COIL MODE |
| PHASE (4) | B→A | C | 0 | 1 | 1 | 0 | 0 | 0 | 0 | 0 | 1 | |
| PHASE (5) | C→A | B | 0 | 1 | 0 | 0 | 1 | 0 | 0 | 0 | 1 | |
| PHASE (6) | C→B | A | 0 | 0 | 0 | 1 | 1 | 0 | 0 | 0 | 1 | |
*FIG. 6*
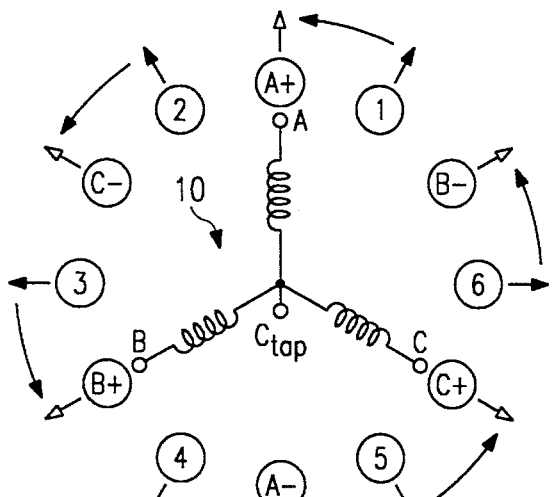
*FIG. 7*
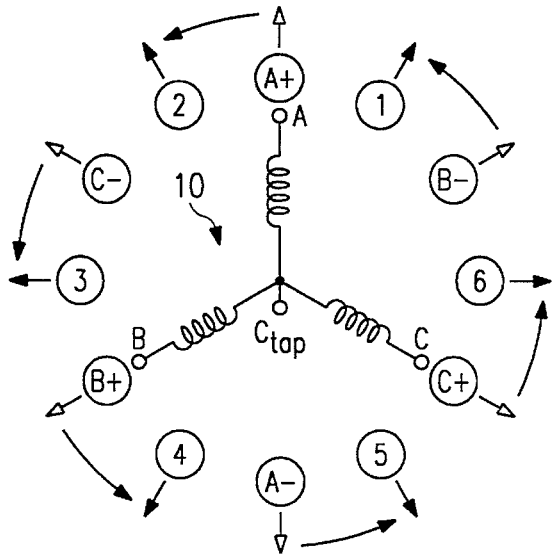
*FIG. 8*

CORRESPONDING PHASE TRANSITIONS WHEN CHANGING
FROM DUAL COIL MODE TO SINGLE COIL MODE

| DUAL COIL MODE | | | | | SINGLE COIL MODE | | | |
|---|---|---|---|---|---|---|---|---|
| PHASE | CURRENT FLOWS FROM→TO | FLOATING COIL | SLOPE OF BEMF | | PHASE | CURRENT FLOWS FROM→TO | FLOATING COIL | SLOPE OF BEMF |
| ① | A→B | C | − | ⇒ | Ⓐ+ | A→$C_{tap}$ | B | + |
| ② | A→C | B | + | ⇒ | Ⓒ− | $C_{tap}$→C | A | − |
| ③ | B→C | A | − | ⇒ | Ⓑ+ | B→$C_{tap}$ | C | + |
| ④ | B→A | C | + | ⇒ | Ⓐ− | $C_{tap}$→A | B | − |
| ⑤ | C→A | B | − | ⇒ | Ⓒ+ | C→$C_{tap}$ | A | + |
| ⑥ | C→B | A | + | ⇒ | Ⓑ− | $C_{tap}$→B | C | − |

*FIG. 16*

CORRESPONDING PHASE TRANSITIONS WHEN CHANGING
FROM SINGLE COIL MODE BACK TO DUAL COIL MODE

| SINGLE COIL MODE | | | | | DUAL COIL MODE | | | |
|---|---|---|---|---|---|---|---|---|
| PHASE | CURRENT FLOWS FROM→TO | FLOATING COIL | SLOPE OF BEMF | | PHASE | CURRENT FLOWS FROM→TO | FLOATING COIL | SLOPE OF BEMF |
| Ⓐ+ | A→$C_{tap}$ | B | + | ⇒ | ② | A→C | B | + |
| Ⓒ− | $C_{tap}$→C | A | − | ⇒ | ③ | B→C | A | − |
| Ⓑ+ | B→$C_{tap}$ | C | + | ⇒ | ④ | B→A | C | + |
| Ⓐ− | $C_{tap}$→A | B | − | ⇒ | ⑤ | C→A | B | − |
| Ⓒ+ | C→$C_{tap}$ | A | + | ⇒ | ⑥ | C→B | A | + |
| Ⓑ− | $C_{tap}$→B | C | − | ⇒ | ① | A→B | C | − |

*FIG. 17*

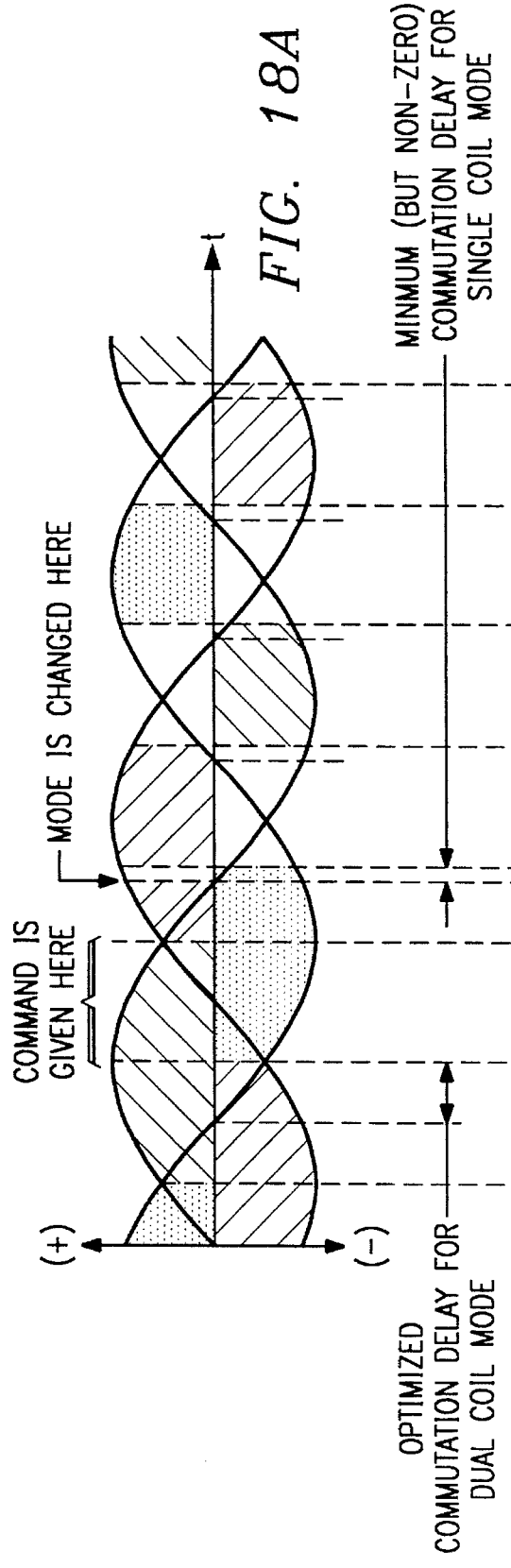

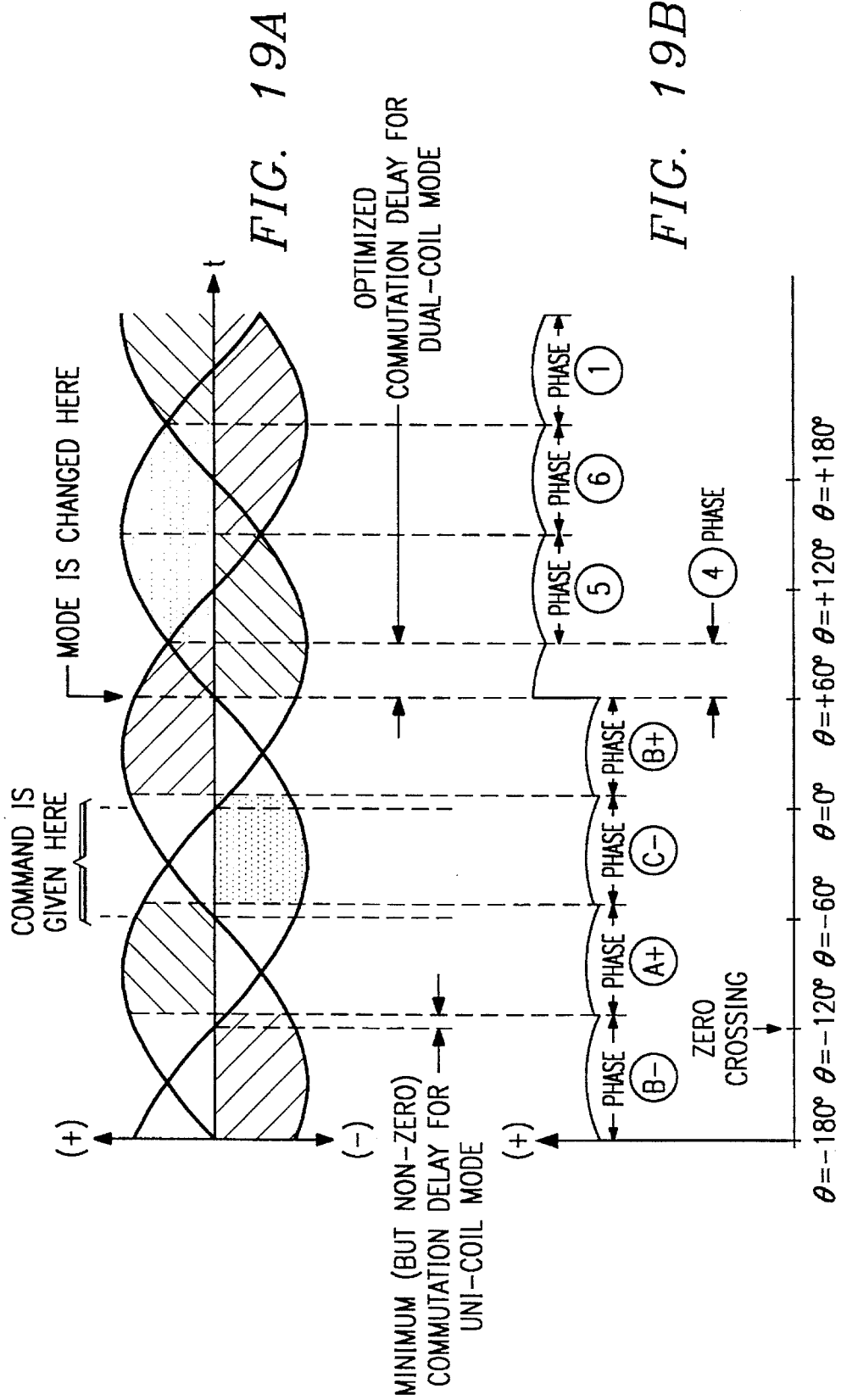

5,455,885

METHOD AND APPARATUS FOR STARTING A SENSORLESS POLYPHASE DC MOTOR IN DUAL-COIL MODE AND SWITCHING TO SINGLE COIL MODE AT SPEED

CROSS REFERENCES TO RELATED APPLICATIONS

This is a continuation of application Ser. No. 08/123,347 filed on Sep. 17, 1993 now abandoned, which is a continuation of Ser. No. 08/085507 filed Jun. 30, 1993, "CIRCUIT AND METHOD FOR OPERATING A 3-PHASE MOTOR WITH A UNI-COIL PHASE COMMUNICATIONS SCHEME", copending application being incorporated herein by reference.

BACKGROUND OF THE INVENTION

1. Field of the Invention

This invention pertains to improvements in circuits and methods for operating polyphase dc motors, and more particularly, to improvements in methods and circuits for operating sensorless 3-phase dc motors through coil phase commutation techniques.

2. Relevent Background

The present invention pertains to polyphase dc motors, and particularly to brushless, sensorless polyphase dc motors that are used for rotating data media, such as found in computer related applications, including hard disk drives, CD ROM drives, floppy disks, and the like. In such computer applications, three phase brushless, sensorless dc motors are becoming more popular, due to their reliability, low weight, and accuracy.

Motors of this type can typically be thought of as having a centrally located stator with three coils connected in a "Y" configuration, although actually, a larger number of stator coils are usually employed with multiple motor poles. In normal operation, the coils are energized in sequences in which current paths are established through various coil combinations, in, for instance, six commutation sequences. More particularly, generally in the conventional operation of three phase motors, current is passed through two coils of the "Y" connected coil configuration, while the third coil is used to generate back emf (bemf) to be sensed for commutation purposes. The maximum achievable speed is related to the maximum torque that the coil arrangement can physically generate, hence, the maximum current capable of being passed through both coils. This in turn is limited by both the back emf produced by the spinning rotor, and the series resistance of the two commutatively selected coils. All possible current combinations for any two of the three terminals (the center tap being reserved for back emf sensing) yields a total of six equi-distant magnetic vectors to commutate through, spinning the rotor.

At high speeds, the back emf induced by a spinning motor limits the amount of current that can be applied to the coils. This in turn limits the torque, and hence, the maximum achievable speed for a given voltage. The amplitude of the back emf is determined in part by the number of flux linkages or coil turns. Presently, a dual coil mode is used to operate sensorless motors.

SUMMARY OF THE INVENTION

In light of the above, it is therefore an object of the invention to provide an improved method and circuit for operating a polyphase dc motor.

It is another object of the invention to provide a method and circuit of the type described that can be used to operate a 3-phase motor with increased efficiency, and at decreased supply voltages.

It is another object of the invention to provide a method and circuit of the type described that can be integrated onto an integrated circuit chip together with other motor driving circuitry.

It is yet another object of the invention to provide an improved method and apparatus of the type described that can achieve a maximum torque with a fixed current, which is determined by the available power, or the power that can be handled.

It is yet another object of the invention to provide an improved method and apparatus of the type described that enables greater motor acceleration.

These and other objects, features and advantages of the invention will be apparent to those skilled in the art from the following detailed description of the invention, when read in conjunction with the accompanying drawings and appended claims.

At high speeds, the back emf induced by a spinning motor limits the amount of current that can be applied to the coils. This in turn limits the torque, and hence, the maximum achievable speed for a given voltage. The amplitude of the back emf is determined in part by the number of flux linkages or coil turns. Presently, a dual coil mode is used to operate sensorless motors. In this invention, a single coil mode is introduced that cuts the coil turns in half, reducing the back emf. This in turn allows for a higher speed to be achieved from a given supply voltage. At start-up, however, there is no back emf. The goal is to achieve a maximum torque with a fixed current, which is determined by the available power, or power that can be handled. Therefore, at start-up, two coils are used to increase the flux linkages, which in turn, intensifies the field produced, and maximizes the torque. This will produce greater acceleration, which will allow the motor to speed up faster. As the motor reaches a speed where the back emf is limiting the torque, the commutation scheme is switched over to the single coil technique which lowers the back emf, and the motor will achieve a higher speed. Detail must be paid as to the method of accomplishing this transition in a smooth manner which will not disrupt the rotational commutation sequence.

In accordance with a broad aspect of the invention, a method is presented for operating a polyphase dc motor of the type having a plurality of driving coils connected together at a center tap. Each driving coil has a coil current input node at an end opposite the center tap connection, and is driven by a pair of switches. Each pair of switches is arranged for connection in series across a power supply voltage, and has a connection node between each switch of each pair connected to a respective one of the coil current input nodes. An additional pair of switches are provided, arranged for connection in series across the power supply voltage and having a connection node between each switch connected to the center tap. The switches are operated to cause a driving current to be passed between sequentially selected pairs of the driving coils for an initial start-up time. After the initial start-up time, the switches are operated to cause a driving current to be passed between sequentially selected only single ones of the driving coils and the center tap current input node.

In the method a sequencing circuit may be provided for individually operating the switches during start-up to cause a driving current to be passed between sequentially selected pairs of driving coils, in accordance with the following table:

| | Current flows from–to | Floating Coils | uA | 1A | uB | 1B | uC | 1C | uC$_{tap}$ | 1C$_{tap}$ |
|---|---|---|---|---|---|---|---|---|---|---|
| Phase 1 | A–B | C | ON | OFF | OFF | ON | OFF | OFF | OFF | OFF |
| Phase 2 | A–C | B | ON | OFF | OFF | OFF | OFF | ON | OFF | OFF |
| Phase 3 | B–C | A | OFF | OFF | ON | OFF | OFF | ON | OFF | OFF |
| Phase 4 | B–A | C | OFF | ON | ON | OFF | OFF | OFF | OFF | OFF |
| Phase 5 | C–A | B | OFF | ON | OFF | OFF | ON | OFF | OFF | OFF |
| Phase 6 | C–B | A | OFF | OFF | OFF | ON | ON | OFF | OFF | OFF | and after startup, between only single ones of the driving coils and the center tap, according to the following table:

| | Current flows from–to | Floating Coils | uA | 1A | uB | 1B | uC | 1C | uC$_{tap}$ | 1C$_{tap}$ |
|---|---|---|---|---|---|---|---|---|---|---|
| Phase A+ | A–C$_{tap}$ | B&C | ON | OFF | OFF | OFF | OFF | OFF | OFF | ON |
| Phase C– | C$_{tap}$–C | A&B | OFF | OFF | OFF | OFF | OFF | ON | ON | OFF |
| Phase B+ | B–C$_{tap}$ | A&C | OFF | OFF | ON | OFF | OFF | OFF | OFF | ON |
| Phase A– | C$_{tap}$–A | B&C | OFF | ON | OFF | OFF | OFF | OFF | ON | OFF |
| Phase C+ | C–C$_{tap}$ | A&B | OFF | OFF | OFF | OFF | ON | OFF | OFF | ON |
| Phase B– | C$_{tap}$–B | A&C | OFF | OFF | OFF | ON | OFF | OFF | ON | OFF | in which:
  the center tap is denoted C$_{tap}$;
  each coil is denoted respectively A, B, and C;
  each high side switch is denoted respectively uA, uB, uC, uC$_{tap}$;
  each low side switch is denoted respectively 1A, 1B, 1C, 1C$_{tap}$;
  each phase is denoted (+) if current flows into the designated coil to the center tap and (–) if current flows out of the designated coil from the center tap;
  and an open switch is denoted OFF, and a closed switch is denoted "ON".

Additionally, a predetermined first delay may be established between a zero crossing of a bemf signal of a floating coil and a commutation of driving signals to the coils in the dual-coil mode and a second predetermined delay established in uni-coil mode.

In accordance with another broad aspect of the invention, an apparatus is presented for operating a polyphase dc motor of the type having a plurality of driving coils connected together at a center tap. Each driving coil has a coil current input node at an end opposite the center tap, and is driven by a switch pair. Each switch pair is arranged for connection in series across a power supply voltage, and has a node between each switch connected to a respective one of the coil current input nodes. An additional pair of switches are provided for connection in series across the power supply voltage with a connection node between each switch connected to the center tap. A circuit is provided to operate the switches to cause a driving current to be passed between sequentially selected pairs of the driving coils for an initial start-up time. Also, a circuit to operate the switches after the initial start-up time is provided to cause a driving current to be passed between sequentially selected only single ones of the driving coils and the center tap current input node.

The apparatus may include a circuit for detecting a zero crossing of a bemf signal of a floating one of the driving coils and a delay circuit for establishing a delay between a zero crossing and a commutation of driving signals to the coils. A circuit may also be provided for operating the delay circuit to provide a first predetermined delay in dual-coil mode and a second predetermined delay in uni-coil mode.

BRIEF DESCRIPTION OF THE DRAWINGS

The invention is illustrated in the accompanying drawings in which:

FIG. 4 is a series of diagrams showing the positions of a rotor of a motor produced by the uni-coil commutation sequences of FIG. 2.

FIG. 6 is a table showing the various commutation switching signals to the driver transistors of the circuit of FIG. 5 for both uni-coil and dual-coil commutation sequence modes, in accordance with the invention.

FIG. 7 is an electrical schematic diagram of a "Y" connected coil arrangement with center tap connection, showing the changes in magnetic fields produced during a phase transition between dual-coil to uni-coil commutation sequence modes.

FIG. 8 is an electrical schematic diagram of a "Y" connected coil arrangement with center tap connection, showing the changes in magnetic fields produced during a phase transition between uni-coil to dual-coil commutation sequence modes.

FIG. 16 is a table showing the corresponding phase transitions in changing from dual-coil to uni-coil commutation sequence modes.

FIG. 17 is a table showing the corresponding phase transitions in changing from uni-coil to dual-coil commutation sequence modes.

FIGS. 18A and 18B are graphs, respectively, of individual coil torque and total applied torque as a function of time, showing a transition from dual-coil to uni-coil commutation sequence modes, for a motor operated in accordance with the invention.

FIGS. 19A and 19B are graphs, respectively, of individual coil torque and total applied torque as a function of time, showing a transition from uni-coil to dual-coil commutation sequence modes, for a motor operated in accordance with the invention.

Figure 1:
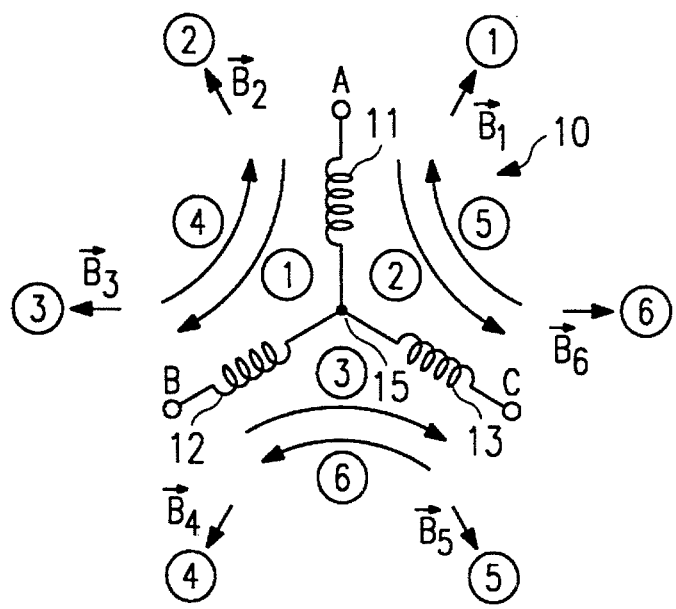
FIG. 1 is an electrical schematic diagram showing a typical "Y" connected coil arrangement and the various magnetic vectors produced by corresponding commuted current flow paths in a dual-coil mode in which current flows through two selected coils in each commutation sequence.

In the various views of the drawings in which actual structures are depicted, the sizes and dimensions of the various parts may have been exaggerated for clarity of illustration and ease of description. In addition, in the various figures of the drawings, like reference numerals are used to denote like or similar parts.

DETAILED DESCRIPTION OF THE PREFERRED EMBODIMENTS

In the operation of sensorless 3-phase motors, according to the invention, current is commutatively applied to selected coils of a "Y" connected coil configuration to cause an associated rotor to turn. An electrical schematic diagram showing a typical "Y" connected coil arrangement 10 and the various magnetic vectors $\vec{B}_1-\vec{B}_6$ produced by corresponding commuted current flow paths in which current flows through two selected coils in each commutation sequence is shown in FIG. 1. Thus, the three coils 11, 12, and 13 are connected at a common center tap node 15, to which connection is made, as below described. For convenience, the ends of the coils 11, 12, and 13 opposite the center tap node 15 are denoted "A", "B", and "C", respectively. Herein, the coils 11, 12, and 13 are sometimes referred to also as coil "A", "B", and "C", respectively, corresponding to the connection node labels.

As a commutation sequencer, described below with reference to FIG. 10, selects among the three coils to identify two at a time through which a driving current is passed, the third coil is placed in a floating, or "tristated", state This is referred to herein as "dual-coil" mode. The back emf generated in the floating coils is sensed to provide position information for commutation purposes.

The dual-coil commutation sequences results in currents flowing in coil pairs, as indicated by lines numbered $i_1-i_6$ for each of the six commutation sequences. All possible current combinations $i_1-i_6$ for each two of the three coils (the center tap connection of the coils being reserved for back emf sensing only in the dual-coil mode) yields a total of six equidistant magnetic vectors 1–6 to commutate through, spinning the rotor. The resulting magnetic vectors from each of the six commutation sequences are shown by vectors $\vec{B}_x$, numbered 1–6 to correspond to the respective current flow paths $i_1-i_6$.

Figure 2:
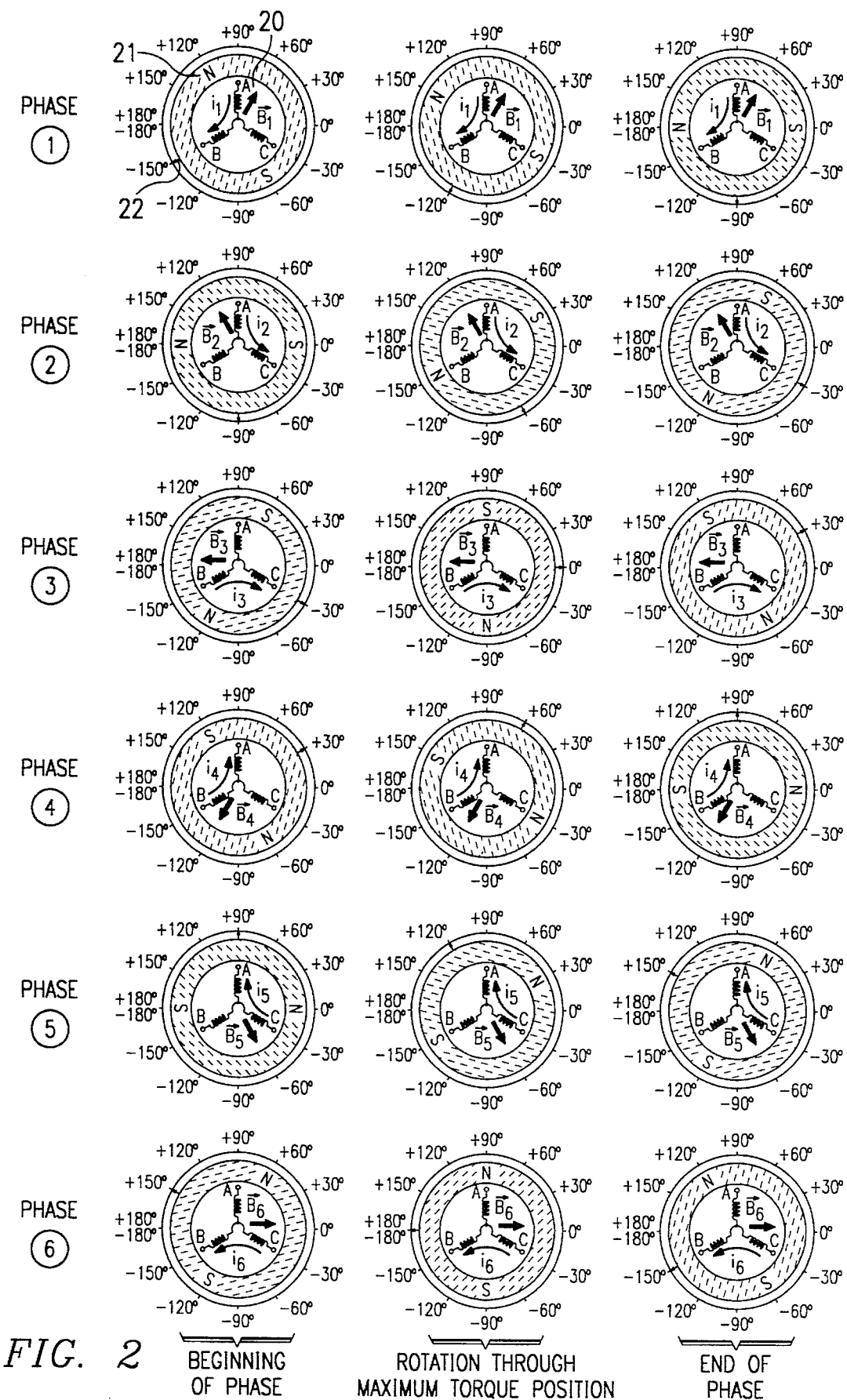
FIG. 2 is a series of diagrams showing the positions of a rotor of a motor produced by the dual-coil commutation sequences of FIG. 1.

"Snapshots" of the various positions of the rotor 20 of the motor for the various commutation current sequences for a motor operated in dual-coil mode are shown in FIG. 2. The angular convention shown is the same as described in the above referenced patent. Thus, beginning at the top left of the chart of FIG. 2, in the row marked "Phase 1", with current $i_1$ flowing through coils 11 and 12, the north pole 21 of the rotor 20 is rotated from approximately +120 degrees to −180 degrees, shown in the drawing sequence from upper left to upper right, and the magnetic vector $\vec{B}_1$ is produced, as shown. At the point at which the north pole 21 of the rotor passes −180 degrees, the current is switched or commutated to flow in the $i_2$ direction, as shown in the second row of the chart of FIG. 2, labeled "Phase 2". The current commutation to produce the current $i_2$ is continued from the beginning of the phase as the north pole 21 is rotated from −180 degrees to −120 degrees, as shown in the sequence from left to right in second row of the drawing, and the magnetic vector $\vec{B}_2$ is produced. Such current commutation is continued in a similar manner, as shown on the chart in FIG. 2 from left to right in each successive phase, sequentially from top to bottom of the chart, then repeated.

The maximum achievable speed of the rotor is related to the maximum torque that can be developed, which, in turn is related to the maximum current that is capable of being passed through the two selected driving coils. The current, on the other hand, is limited both by the back emf produced by the spinning rotor in the floating coil, and the series resistance of the two coils. Consequently, upon motor start-up, the ability to provide as great a torque on the rotor is best met by operating the motor in dual-coil mode, since bemf is not yet well established, and larger magnetic fields can be produced.

Figure 3:
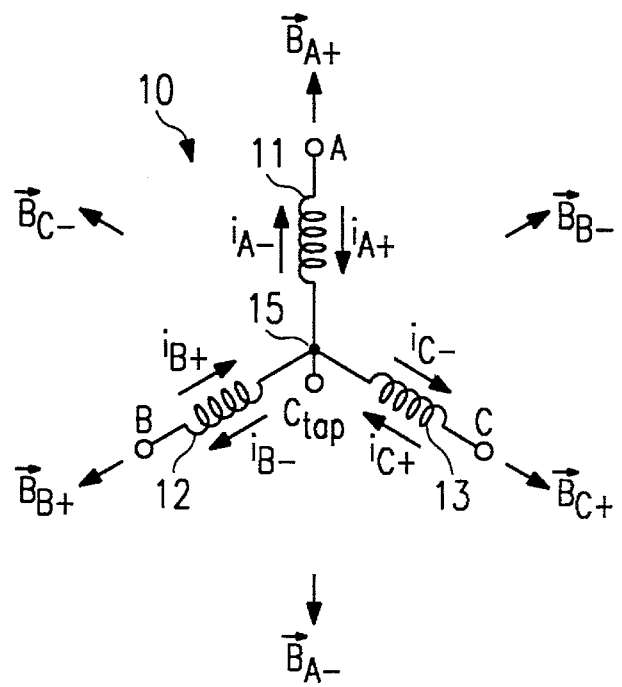
FIG. 3 is an electrical schematic diagram showing a typical "Y" connected coil arrangement with center tap connection, and various magnetic vectors produced by respective commuted current flow paths in a uni-coil mode in which current flows through only one selected coil in each commutation sequence.

According to the present invention, six equidistant vectors can also be produced if the center tap is switched, allowing current to flow only through one coil at a time. This is referred to herein as "uni-coil" mode. Thus, as shown in FIG. 3, in uni-coil mode, current is injected into the respective coils 11–13 at the current input nodes A, B, and C, it being understood that although the nodes A, B, and C are referred to as "current input nodes", the direction of the current may be either into or away from the respective nodes from the center tap connection 15.

The currents that flow in the coil 11 are designated by the legends $i_{A-}$ and $i_{A+}$, referring to current flowing respectively from the center tap connection 15 to the terminal A, and from the terminal A to the center tap connection 15 through the coil 11. The legends $i_{B-}$ and $i_{B+}$ designate the current flowing respectively from the center tap connection 15 to the terminal B, and from the terminal B to the center tap connection 15 through the coil 12. Finally, the legend $i_{C-}$ and $i_{C+}$ designate the current flowing respectively from the center tap connection 15 to the terminal C, and from the terminal C to the center tap connection 15 through the coil 13.

Six magnetic vectors $B_{A+}$, $B_{C-}$, $B_{B+}$, $B_{A-}$, $B_{C+}$, $B_{B-}$, are developed in the directions shown in response to the respective currents in the coils 11–13.

In a manner similar to that described in FIGS. 1 and 2 above with respect to the dual-coil mode, operation in accordance with the uni-coil mode causes the rotor 20 to rotate in the manner shown by the various motor positions indicated in FIG. 4. Thus, beginning at the top of the chart of FIG. 4, in the row marked "Phase A+", with current $i_{A+}$ flowing from node "A" to the center tap node 15, the north pole 21 of the rotor 20 is rotated from approximately +150 degrees to −150 degrees, and the magnetic vector $B_{A+}$ is produced, as shown. At the point at which the north pole 21 of the rotor 17 passes −150 degrees, the current is switched or commutated to flow in the $i_{C-}$ direction to flow from the center tap node 15 to node "C", as shown in the second row of the chart of FIG. 2, labeled "Phase C−". The current commutation flowing from the center tap node 15 to the terminal C to produce current $i_c$ is continued from the beginning of the phase as the north pole 21 is rotated from −150 degrees to −90 degrees. Such current commutation is continued on the chart shown in FIG. 4 from left to right in each phase, sequentially from top to bottom of the chart, then repeated.

Once the rotor has been brought to or near a desired operating speed, the bemf becomes established, and more efficient operation is possible through the use of the uni-coil mode. Thus, at speed, since the current passes only one coil in uni-coil mode, the bemf is lower than in dual-coil mode, and higher operating currents can be employed.

A circuit 50 for accomplishing either uni-coil or dual-coil commutations described above is shown in FIG. 5. The circuit 50 includes four sets of switch pairs 51, 52, 53, and 54. The switches may be, for example, bipolar power transistors, MOSFETs (as shown), or other transistor types known in the art. Each switch pair is connected in series across a supply voltage on line 55, shown as a supply voltage $V_{CC}$. Nodes A-C and $C_{tap}$ are respectively associated with each switch pair 51–54 are connected respectively to the terminals A, B, C, and $C_{tap}$ of the driving coils 10. The switch pairs 51–54 each include an upper switch, sometimes referred to herein as a high side driver, and lower switch, sometimes referred to herein as a low side driver, and are driven by signals respectively denoted as uA, 1A, uB, 1B, uC, 1C, $uC_{tap}$, and $1C_{tap}$.

The switches of the switch pairs 51–54 are sequentially turned on and off by a sequencer circuit, described below in detail, in accordance with the table shown in FIG. 6. In FIG. 6, the state delivered by the commutation circuit to the gates of the respective MOSFET switches 60–67 of each of the pairs of switches 51–54 is shown for each uni-coil sequence, beginning at phase A+ through phase B−, and for each dual-coil sequence beginning at phase 1 through phase 6.

If desired, as shown, the logic states of the lower driver transistors 61, 63, 65, and 67 can be controlled by a feedback circuit 70, such feedback circuits being known in the art. The feedback circuit 70 is sometimes referred to as a "transconductance circuit".

The output from the circuit 50 is taken from the interconnections of the respective switches of switch pairs 51–54 at nodes A, B, C, and $C_{tap}$. The nodes A, B, C, and $C_{tap}$ are connected to respective stator terminals A, B, and C of the motor, and the center tap terminal $C_{tap}$. Thus, as the commutation controller, or sequencer described below with reference to FIG. 10, sequences the conduction of the various switches of switch pairs 51–54 with a predetermined commutation sequence, current is caused to flow in the various individual stator coils 10 to produce the desired rotation of the rotor of the motor.

As mentioned, at start-up, the stator coils are operated in dual-coil mode, for maximum torque and rapid starting. At or near the desired operating speed, the coils are switched to uni-coil mode for efficient operation. At switchover, as shown in FIG. 7, the phase transition advances 30 degrees in the direction of rotation, because of the loss in contribution to the magnetic field by the coil that is dropped from the current path, and the magnetic field vector will align with the coil remaining in the current path. On the other hand, if it should be necessary to switch back from uni-coil to dual-coil modes of operation, as shown in FIG. 8, again the phase transition will advance 30 in the direction of rotation, since the coil that is added to the current path will contribute to the magnetic field, and the magnetic field vector will represent the sum of the vectors from each coil.

Figure 9:
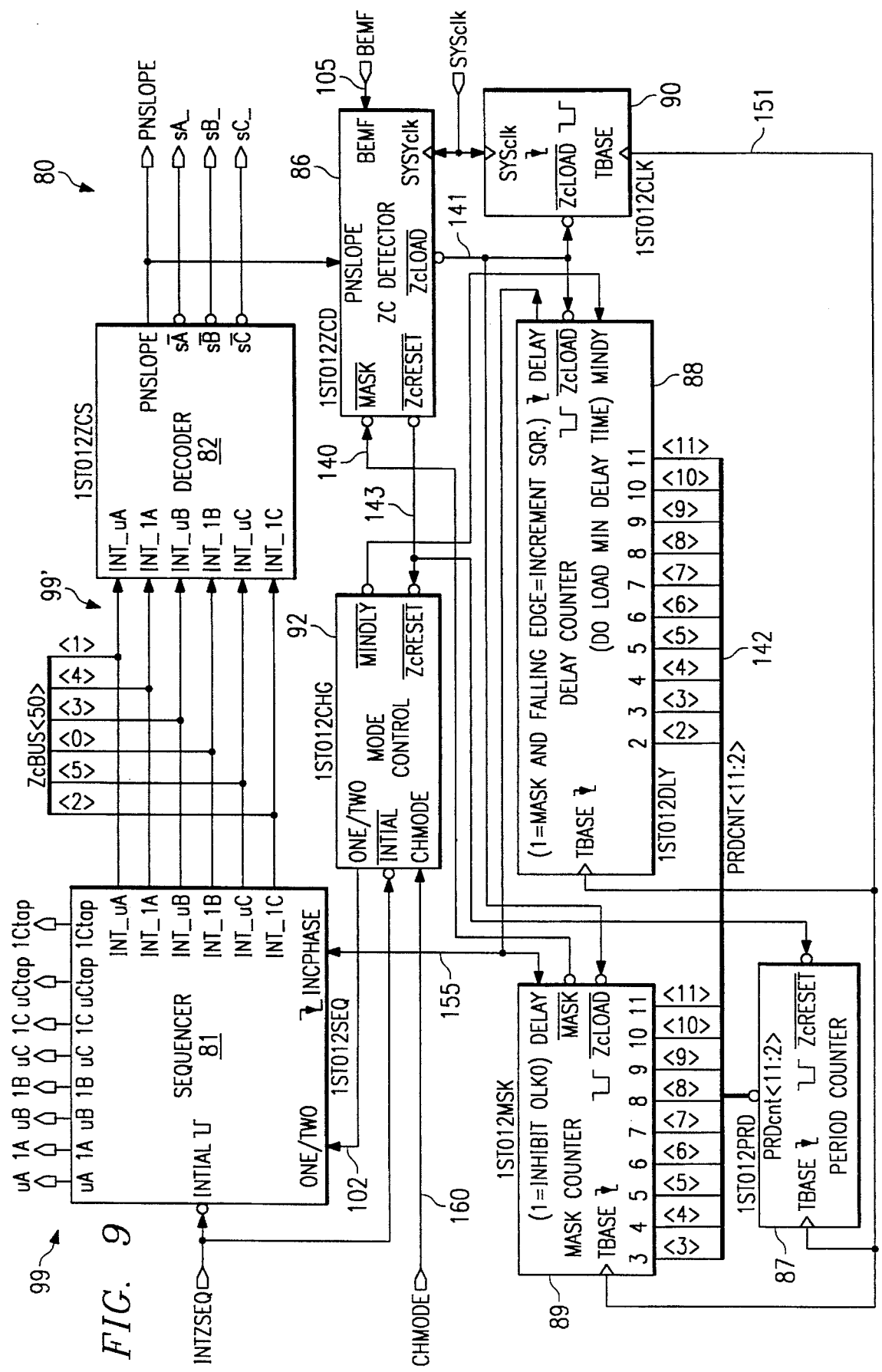
FIG. 9 is an electrical schematic block diagram of a motor control system in accordance with the invention.

A portion of an electrical schematic block diagram of a motor controller 80 that can be used to practice the apparatus and method in accordance with a preferred embodiment of the invention is shown in FIG. 9. Although the motor controller can be constructed of discrete components, preferably, the motor controller 80 is integrated onto a single semiconductor chip adapted for connection to the stator coils of a three phase dc brushless spindle motor, for use, for example, to turn a magnetic or other disk in systems such as computer hard disk drives, CD-ROM drives, floppy disk drives, and the like. It should be noted that although a preferred embodiment of the invention is described with regard to a three phase motor, in particular, the principles of the invention can be equally advantageously applied to polyphase motors, in general.

The driving voltage is provided by the power stage 50 (see

Figure 5:
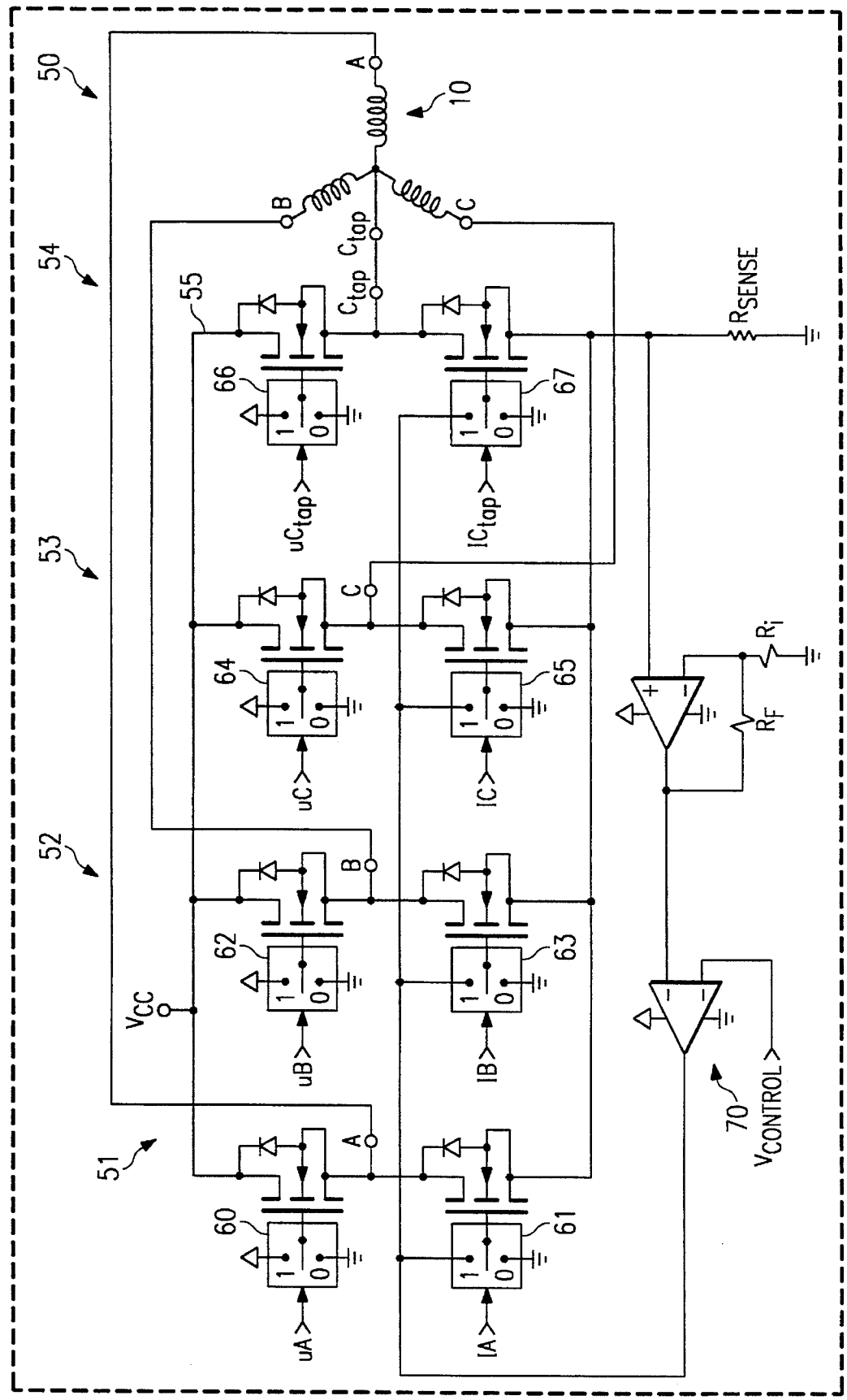
FIG. 5 is an electrical schematic diagram showing a MOSFET motor driver circuit that can be used in operation of a three phase dc motor in both uni-coil and dual-coil commutation sequence modes, in accordance with the invention.

FIG. 5) to the terminals A, B, and C in accordance with signals, uA, 1A, uB, 1B, uC, 1C, $uC_{tap}$, and $1C_{tap}$, developed by a sequencer circuit 81. The sequencer 81 also provides drive signals to other circuits of the controller circuitry to control the various aspects of rotation of the motor driven by the circuit 80.

The sequencer circuit 81 can provide sequencing signals to drive the stator coils of the motor in either uni-coil or dual-coil modes, depending upon the state of the signal applied to the line "one/two" 102. The line 102 is connected to the gates of the logic circuitry 97 such that in dual-coil mode, the signals delivered to the terminals 99 are as shown in the following table A:

TABLE A

|  | Current flows from–to | Floating Coils | uA | 1A | uB | 1B | uC | 1C | $uC_{tap}$ | $1C_{tap}$ |
|---|---|---|---|---|---|---|---|---|---|---|
| Phase 1 | A–B | C | ON | OFF | OFF | ON | OFF | OFF | OFF | OFF |
| Phase 2 | A–C | B | ON | OFF | OFF | OFF | OFF | ON | OFF | OFF |
| Phase 3 | B–C | A | OFF | OFF | ON | OFF | OFF | ON | OFF | OFF |
| Phase 4 | B–A | C | OFF | ON | ON | OFF | OFF | OFF | OFF | OFF |
| Phase 5 | C–A | B | OFF | ON | OFF | OFF | ON | OFF | OFF | OFF |
| Phase 6 | C–B | A | OFF | OFF | OFF | ON | ON | OFF | OFF | OFF |

The output signals uA, 1A, uB, 1B, uC, 1C, $uC_{tap}$, and $1C_{tap}$ are also connected to a decoder 82 for controlling a back-emf zero crossing detector 86, the details of which are described with reference to FIG. 13 below. The back-emf sense amplifier 86 in turn provides input signals to a period counter 87, a delay circuit 88, and mask circuit 89. The In addition, in the uni-coil mode, the signals are as shown in the following table B:

TABLE B

|  | Current flows from–to | Floating Coils | uA | 1A | uB | 1B | uC | 1C | $uC_{tap}$ | $1C_{tap}$ |
|---|---|---|---|---|---|---|---|---|---|---|
| Phase A+ | A–Ctap | B&C | ON | OFF | OFF | OFF | OFF | OFF | OFF | ON |
| Phase C– | Ctap–C | A&B | OFF | OFF | OFF | OFF | OFF | ON | ON | OFF |
| Phase B+ | B–Ctap | A&C | OFF | OFF | ON | OFF | OFF | OFF | OFF | ON |
| Phase A– | Ctap–A | B&C | OFF | ON | OFF | OFF | OFF | OFF | ON | OFF |
| Phase C+ | C–Ctap | A&B | OFF | OFF | OFF | OFF | ON | OFF | OFF | ON |
| Phase B– | Ctap–B | A&C | OFF | OFF | OFF | ON | OFF | OFF | ON | OFF | output of the delay circuit 88 controls the operation and incrementing of the sequencer 81, and the mask circuit operates to mask commutation noise in the zero crossing detection, in a manner below described in detail. The motor controller circuitry 80 includes system clock circuitry 90 to provide various clock signal functions. A mode control circuit 92 is provided to switch the operation of the sequencer 81 between uni-coil and dual-coil modes.

Figure 10:
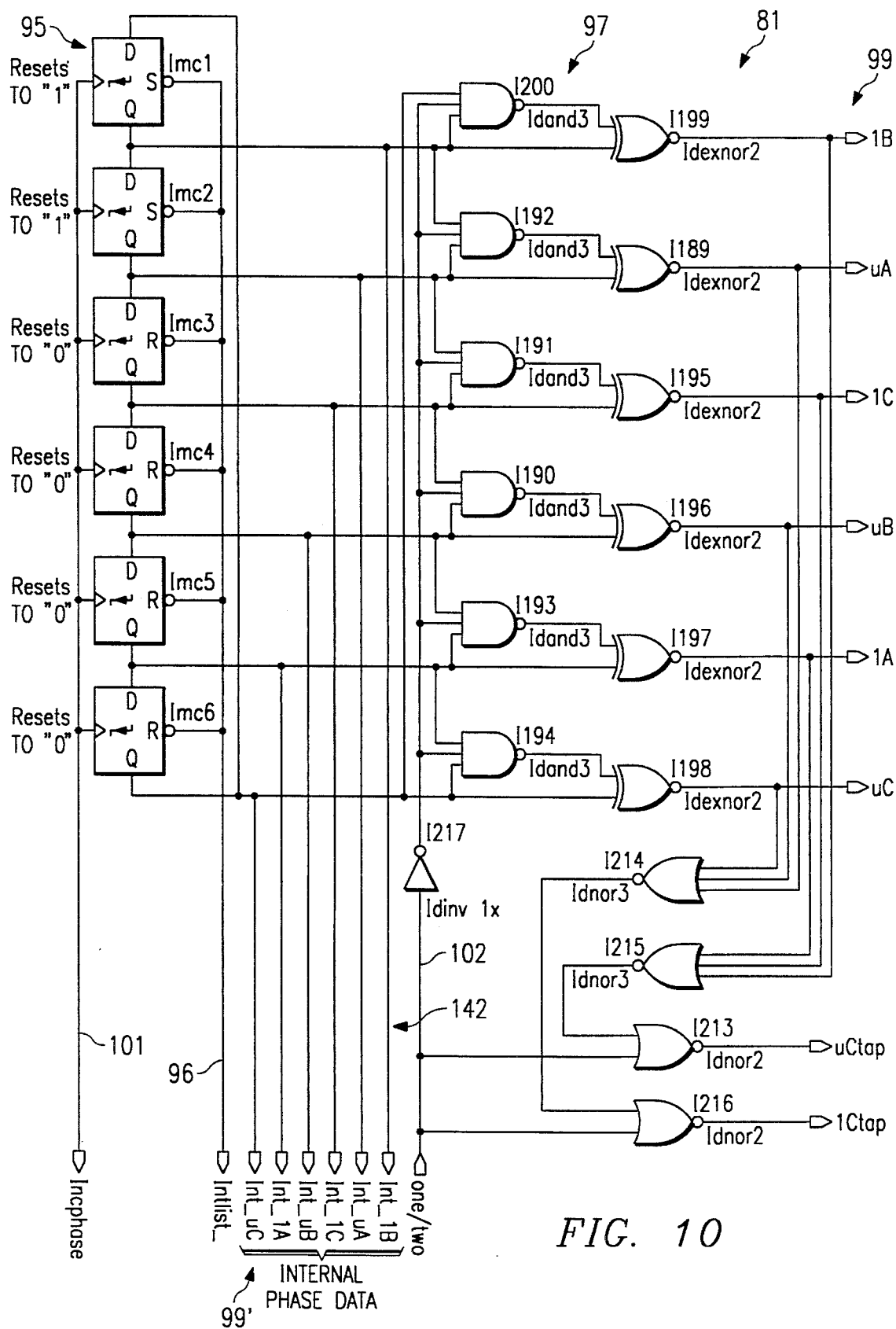
FIG. 10 is an electrical schematic diagram showing a commutation circuit that can be used for uni-coil or dual coil commutation switching in the operation of the driver circuit of FIG. 5, in accordance with the invention.

The sequencer circuit 81 that can be used to provide the logic signals to the driver circuit 50 of FIG. 5 is shown in FIG. 10. The sequencer 81 includes a shift register 95 through which a series of logic signals is continuously recirculated. The sequencer is initialized by a signal on an initialize line 96 such that the register 95 contains an initial sequence, such as "110000". The outputs from each stage of the shift register 95 are applied to the logic circuitry 97 to present the commutation logic signals on the output terminals, uA, 1A, uB, 1B, uC, 1C, $uC_{tap}$, and $1C_{tap}$, 99.

The logic sequence is continuously circulated through the shift register 95 by signals applied to an increment input line 101, representing a signal generated in response to the back emf signals developed from a floating coil to develop the required continuous commutation output states on the output terminals 99.

Figure 11:
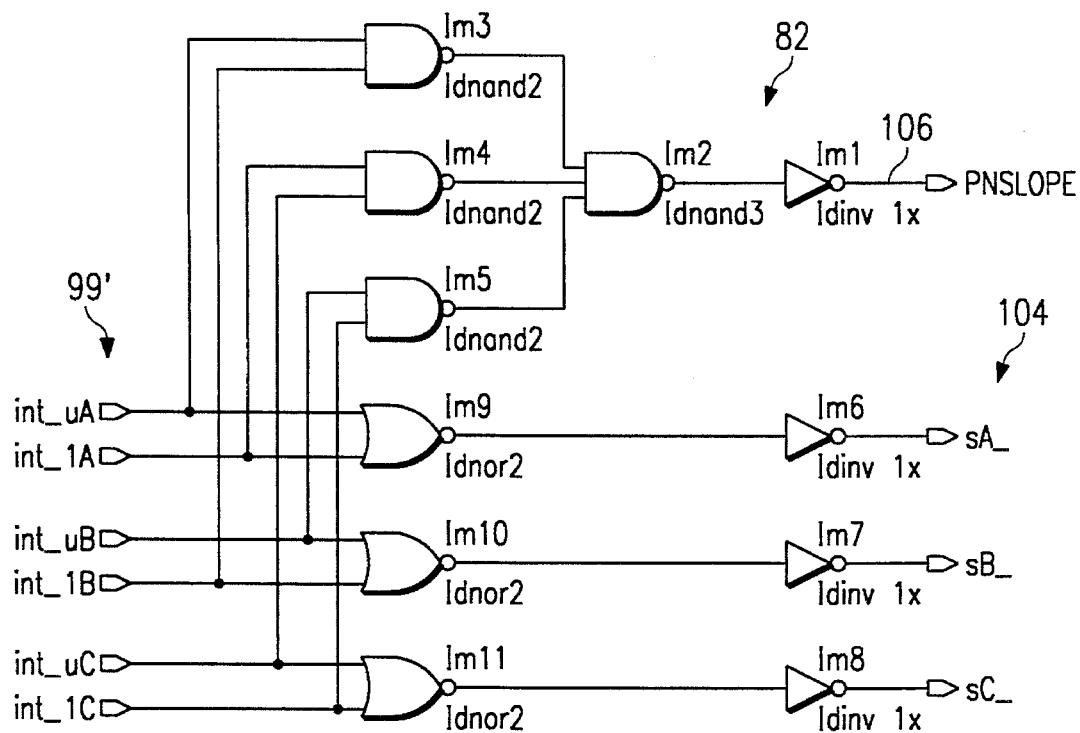
FIG. 11 is an electrical schematic diagram of a commutation bus decoder for operation of the zero crossing detector of FIG. 12.

In addition to the driver circuit, the signals uA, 1A, uB, 1B, uC, and 1C from the sequencer are applied on lines 99' to the input of the decoder circuit 82, shown in detail in FIG. 11. The decoder circuit 82 develops switching signals on output terminals, sA, sB, and sC, 104 to control switches (not shown) to direct the bemf of a coil that is instantaneously in a floating state to the bemf input of the zero crossing detector 86 on line 105. Details of such switching circuit can be seen in U.S. Pat. No. 5,221,881, incorporated herein by reference. Since the decoder circuit 82 of FIG. 11 derives internal phase data on lines 99' from the output from the sequencer 81 in FIG. 10, the output signal sA indicates that the coil at node A (see FIG. 1) is expected to be floating, sB indicates the coil at node B is expected to be floating, and the output signal sC indicates the coil at node C is expected to be floating.

In addition to the bemf control signals, a signal, denoted "pnslope" is generated by the circuit 82 on line 106. The state of the "pnslope" signal represents the anticipated slope of the bemf signal of the floating coil to be detected for commutation of the sequencer 81.

The commutation among the coils 11. 12. and 13 is performed in response to information indicating the specific position of the rotor of the motor in conjunction with circuit information indicating the desired position of the rotor. More specifically, the commutation to apply the next drive sequence of Table A or Table B, depending upon the mode of operation, is determined in response to a corresponding coil reaching a particular rotational position and its correlation with sequencer information indicating where the motor should be when a commutation is to occur. The determination of the precise rotational location of the rotor is continuously being determined by monitoring the zero crossing voltage of the back emf in each non-driven, or floating, coil. More particularly, as the coils 11, 12, and 13 are switched during the commutation sequence of the rotor, the voltage of the particular floating coil is monitored by the back emf zero crossing detector 86 shown in FIG. 12.

The back emf detector 86 receives the switched bemf signal on line 105 to apply a selected one of the outputs on node A, B, or C to the non-inverting input of a comparator (not shown). The particular one of the rotor outputs on node A, B or C that is selected corresponds to whichever of coils 11, 12, or 13 that is expected to be floating and on which a zero crossing is expected. Although the term "floating" is used herein to indicate the coil that is not in the instantaneous current path, the coil does not actually "float", but is connected to a tristate impedance.

The center tap connection 15 (see FIG. 1) of the rotor 10 is connected to the inverting input of the comparator, so that when the voltage on the selected floating coil becomes larger than the center tap voltage, the comparator produces an output on line 105, representing the zero voltage crossing of the voltage on the selected floating coil. For additional details of the comparator construction and operation, reference may be made to the aforementioned U.S. Pat. No. 5,221,881.

Figure 12:
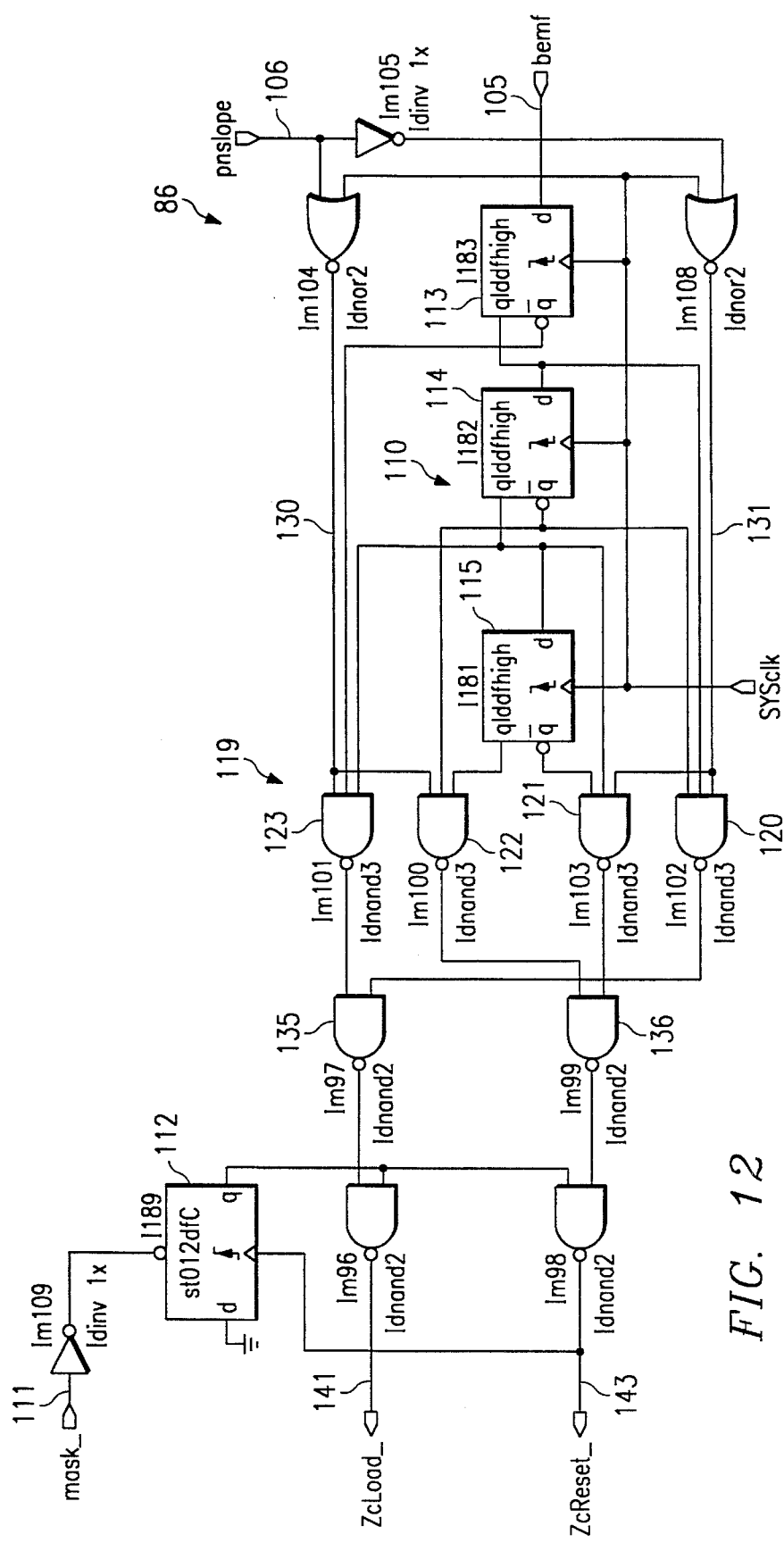
FIG. 12 is an electrical schematic diagram of a zero crossing detector that can be used in the motor control circuit of FIG. 9.
Figure 14:
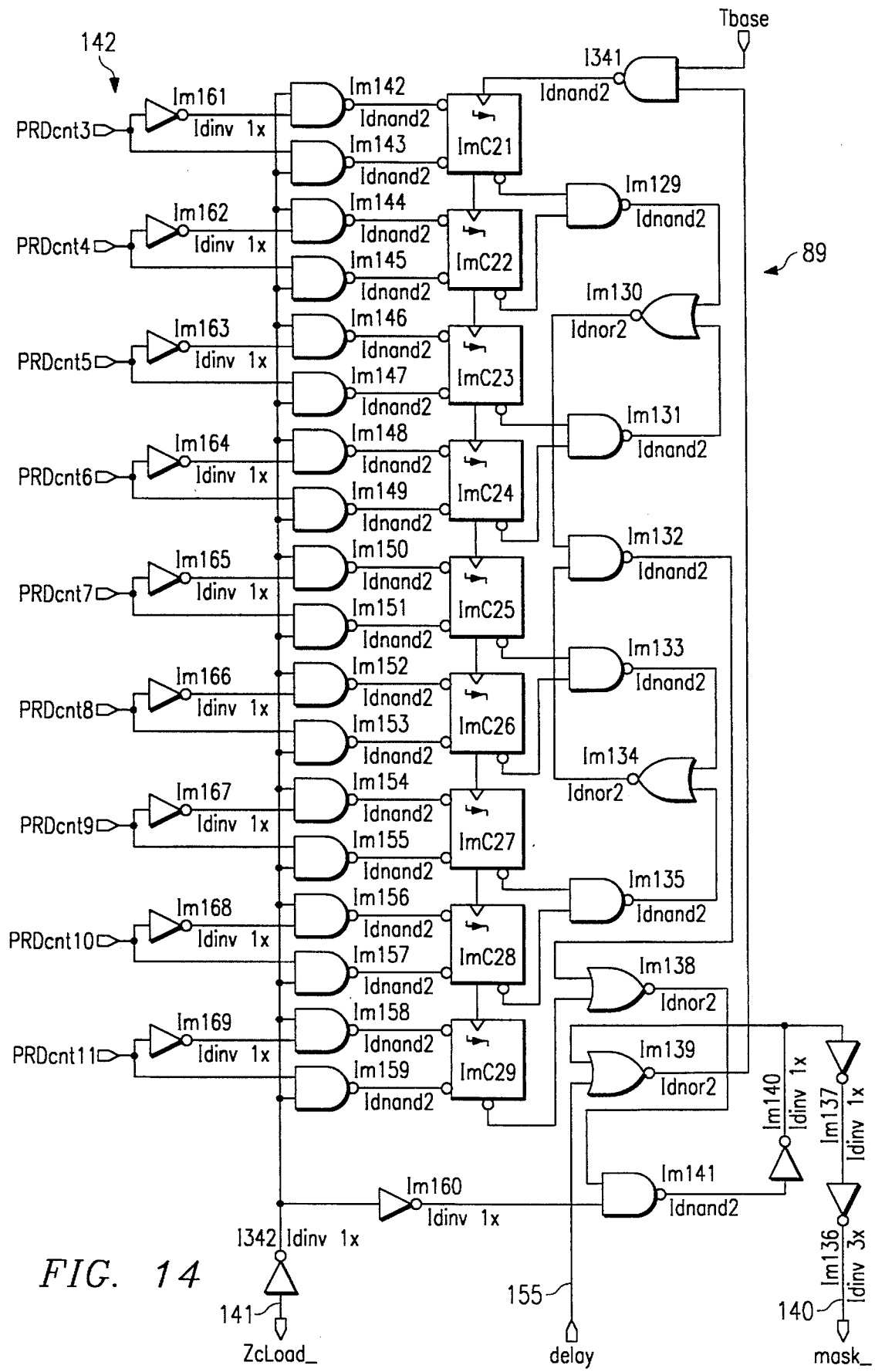
FIG. 14 is an electrical schematic diagram of a mask counter, that can be used in the motor control circuit of FIG. 9

With further reference to FIG. 12, the bemf signal on line 105 is connected to a shift register 110. The mask signal generated by the mask counter 89 (see FIG. 14) is applied, via line 111, to enable a flip-flop 112 to start masking the bemf on the trailing edge of the reset pulse on line 143. (The reset pulse on line 143 indicates the end of the occurrence of the zero crossing, as below described.)

The bemf signal is applied to the D input of the first of three D-type flip flops 113, 114, and 115 of which the shift register 110 is comprised.

The various outputs of the flip flops 113, 114, and 115 are connected to the output logic circuit 119, which includes NAND gates 120, 121, 122, and 123. Each of the flip flops 113, 114, and 115 receive a clock input, for example from the system clock, and each produces an inverted ($\bar{Q}$) and non-inverted (Q) output. The Q outputs of flip flops 113, 114, and 115 are applied to the D input of the respective next stage flip flops, and the Q output of the last stage flip flop 115, is connected to NAND gate 121 of the output logic circuit 119.

The Q output of the flip flop 113 is connected to an input of the NAND gate 120. The Q output of the flip flop 114 is connected to inputs of NAND gates 121 and 123. The Q output of the flip flop 115 is connected to an input of the NAND gate 122. On the other hand, the $\bar{Q}$ output of flip flop 113 is connected to input of NAND gate 123, while the $\bar{Q}$ output of flip flop 114 is connected to inputs of the NAND gates 120 and 122. Finally the $\bar{Q}$ output of flip flop 115 is connected to input of the NAND gates 121.

Also, expected slope line 130, carrying a signal corresponding to an expected negative-to-positive going zero crossing slope is connected to inputs of NAND gates 122 and 123, and expected slope line 131 corresponding to an expected positive-to-negative going zero crossing slope is connected to inputs of NAND gates 121 and 122. As described above, the signals on lines 130 and 131 that indicate the direction of the expected zero crossing are generated from the phase information developed in the decoder circuit 82 of FIG. 11, which in turn, is derived from the outputs of the shift register 95 in the sequencer circuit 81 of FIG. 10.

Finally, the outputs from the logic circuit 119 are connected to the output NAND gates 135 and 136, the outputs of which being produced in response to the detection of an actual zero crossing of a specified floating coil, the zero crossing having a transition in a specified, expected direction, i.e., either a negative-to-positive going zero crossing transition or a positive-to-negative going zero crossing transition.

The connections to the output NAND gates 135 and 136 are established with the output of the upper NAND gate 123 and the lower NAND gate 120 connected to the inputs of the output NAND gate 135, and the output of the upper NAND gate 122 and the output of the lower NAND gate 121 connected to the inputs of the output NAND gate 136. The line 130 on which a signal would appear if a negative slope zero crossing is expected is connected to the inputs of the upper NAND gates 122 and 123, and the line 131 on which a signal would appear if a positive slope zero crossing is expected is connected to the inputs of the lower NAND gates 120 and 121. Thus, the upper NAND gates 122 and 123 are responsive to the actual occurrence of an expected negative slope zero crossing and the lower NAND gates 120 and 121 are responsive to the actual occurrence of an expected positive slope zero crossing.

Because of the staged connections at the three stage shift register 110 for each of the positive and negative detection paths, the outputs from the output NAND gates 135 and 136 are two pulses, spaced in time, resulting from either a positive-to-negative zero crossing or a negative-to-positive zero crossing. Thus, the pulse generated at the output of NAND gate 135 precedes the pulse generated at the output of NAND gate 136 by one-half clock cycle (SYSclk). The output of the NAND gate 135 is used to provide a "load" signal on line 141 to the counters which determine the required mask and delay time after a phase commutation and the output of the NAND gate 136 is used to provide a "reset" signal on line 143 to the period counter, as below described.

As can be seen from FIG. 9, the load and reset signals from the zero crossing detector 86 are applied to the period counter 87, the delay counter 88, and the mask counter 89. The period counter 87 (being an up counter) receives a clock signal input from a clock frequency divider 90, which divides the system clock frequency to a desired frequency, the frequency selected determining the resolution of the system. The period counter 87 is reset by the reset pulse produced on line 143 in the circuit of FIG. 12, after the actual occurrence of a desired zero crossing has been detected. Accordingly, the period counter 87 starts to count up after being reset, and continues the count until being again reset upon the detection of the next actual zero crossing.

The period counter 87 is an up counter that is connected by bus 142 to the inputs of each of the down delay and mask counters 88 and 89, which serve mask, delay, and control functions. Details of the down mask counter 89 are shown in the schematic diagram of FIG. 14. The down mask counter 89 determines a mask that serves to mask the noise produced by the coils 11, 12, and 13 in response to being commutated, forming an output on line 140 when the desired mask count has timed out. The mask counter output signal on the line 140, for example, is used to set the flip-flop 112 in the zero crossing detector in FIG. 12, so that a zero crossing can be detected after the expiration of the mask period. The mask counter 89 receives a "LOAD" signal on line 141, the "LOAD" signal being produced by the output of the NAND gate 135, shown in FIG. 12, just prior to the occurrence of the RESET pulse upon the output of the NAND gate 136.

Thus, in operation, when an actual zero crossing of a selected floating coil is detected by the zero crossing detector 86 of FIG. 12, the count that exists in the period counter 87 is loaded via bus 142 into the mask counter 89. The period counter 87 is reset to begin a new period count that will continue until the occurrence of the next zero crossing. At that time, the new count will be loaded into the mask counter 89, the period counter 87 will be reset, and the process is repeated. It can therefore be seen that the actual mask time determined by the mask counter 87 will vary, depending upon the speed of rotation of the motor, as tracked by the period counter 87.

Figure 13:
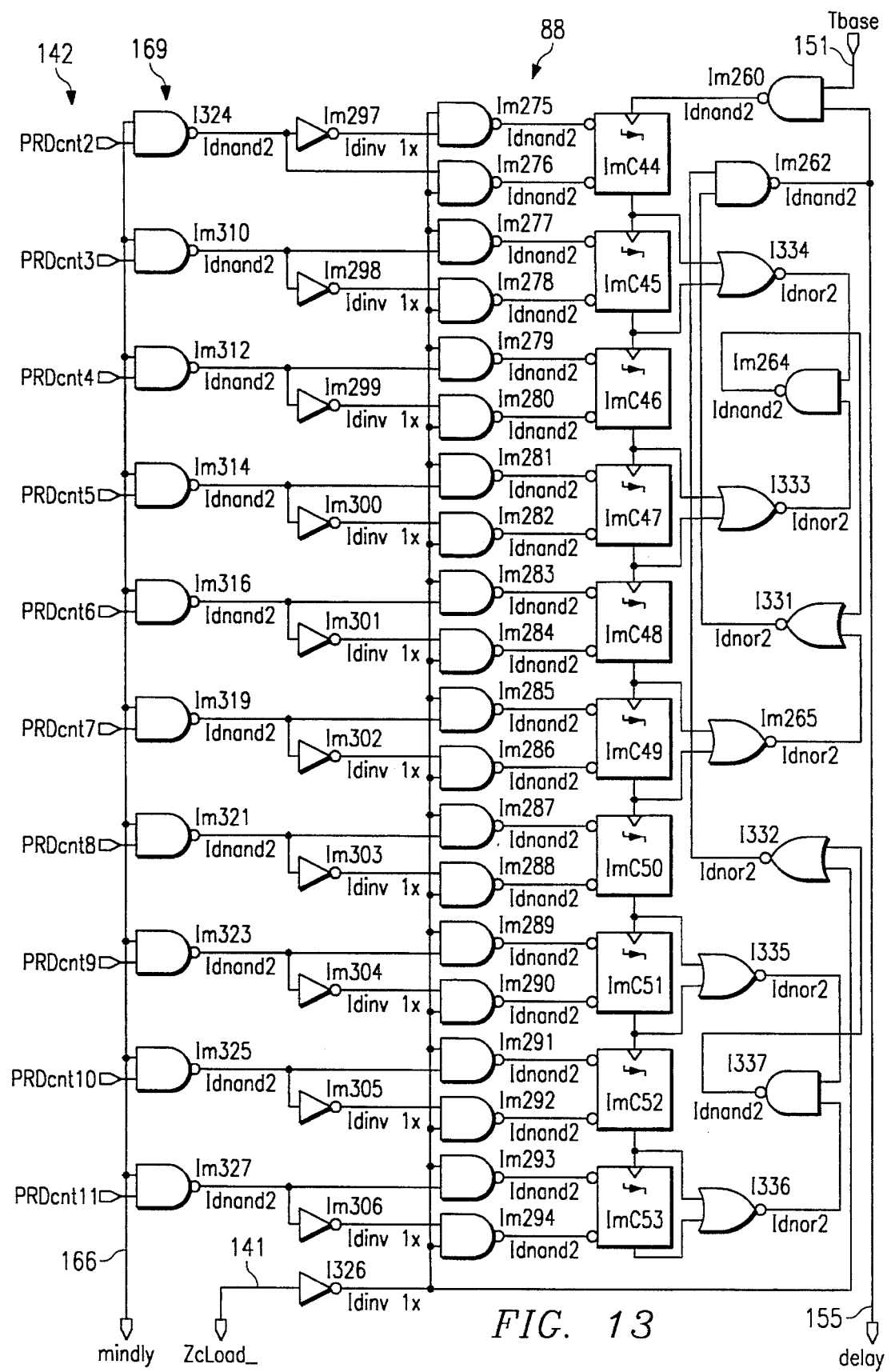
FIG. 13 is an electrical schematic diagram of a delay counter, that can be used in the motor control circuit of FIG. 9.

In a similar fashion, the delay down counter 88, shown in detail in FIG. 13, serves to count a time corresponding to a delay after the detection of a zero crossing before the coils are switched or commutated to the next phase. The delay counter 88 is clocked by a clock signal on line 151. The operation of the load and count functions in response to signals on load line 141 is essentially the same as the operation of the mask counter 89 above described.

The output of the delay counter 88 on the line 155 is applied to the clock input of the mask counter 89 and to the sequencer 81. The signal on the output line 155 of the delay counter 88 inhibits the application of the clock pulses to the mask counter 89 until after the completion of the delay count by the delay counter 88. The counts of the mask counter 89 and the delay counter 88 are therefore sequential, with the mask count of the mask counter 89 following the completion of the delay count of the delay counter 88. Additionally, the signal on the output line 155 increments the sequencer 81 to advance to the next commutation sequence for application to the stator coils of the motor.

Because the delay circuitry 88 operates on the actual, not expected, zero crossing signals of the floating rotor coils, the rotor commutation is based upon a delay calculated after an actual zero crossing of an anticipated floating coil occurs. Thus, for example, the output of the delay counter 88 on the output line 155 is used to initiate a coil commutation. Then, since the mask counter 89 is also dependent upon the delay counter output signal to begin its count, the switching noise from the sequencer circuit 81 and switching transients produced by the coils can be masked, so that spurious zero crossings caused by switching noise will not be interpreted as an actual zero crossing of the selected floating coil.

Figure 15:
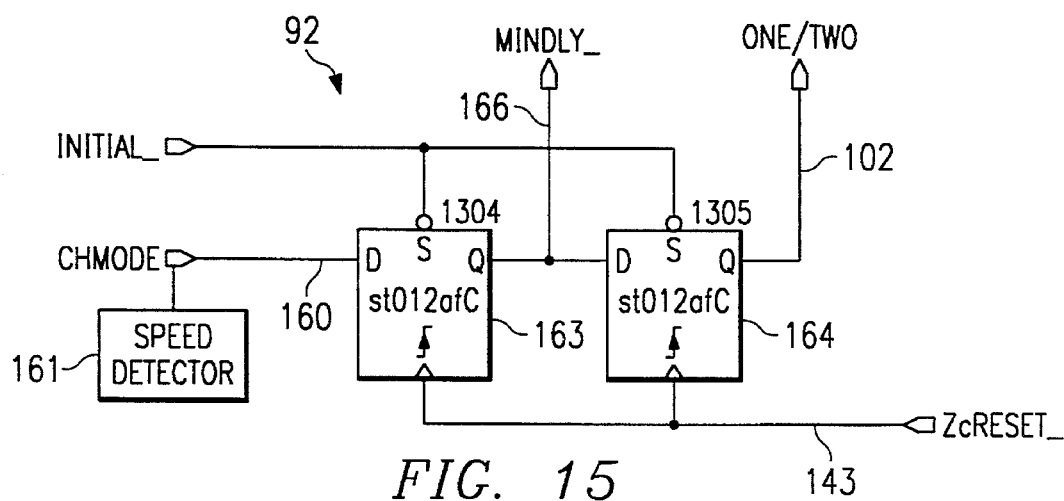
FIG. 15 is an electrical schematic diagram of a sequential mode changing circuit that can be used in the motor control circuit of FIG. 9.

The last major circuit of the motor driver 80 is the coil mode control circuit 92, shown in FIG. 15. When it is desired to change the operation of the circuit from dual coil mode to uni-coil mode, a signal is applied to the "chmode" input line 160 to the mode control circuit 92. Such mode change, for example, can be effected after startup, when the motor has achieved a predetermined speed, detected, for example by a speed detector circuit 161. The mode control circuit 92 includes two D-type flip-flops 163 and 164 that are clocked by the reset output from the zero crossing detector circuit 86 on line 143. Each of the Q outputs of the flip flops 163 and 164 produces a state change on lines 166 and 102, respectively to provide a delay control signal on line 166 and a mode change signal on line 102.

Thus, when a mode change is commanded by a state change on line 160 to the mode control circuit 92, a state change first appears on the delay control signal line 166 that is applied to the delay counter circuit 88 of FIG. 13. The delay control signal is applied to the input gates 169 of the delay counter circuit 88, thereby inhibiting the count on the bus 142 from being loaded into the counter. This results in a zero, or minimum delay being produced by the delay counter, in the uni-coil mode. Consequently, in the uni-coil mode, essentially no delay is introduced after a zero crossing is detected before a commutation is performed.

Next, in the operation of the mode control circuit 92, after the minimum delay has been effected, the Q output of the second flip-flop 164 changes state, to provide a command on line 102 to the sequencer 81 shown in FIG. 10 to operate in uni-coil mode. It is noted that when the sequencer 81 is switched from dual-coil to uni-coil mode, the next sequence that is necessary to continue rotation of the rotor (with the 30 degree advance indicated above) is automatically selected. A table showing the relationship of the corresponding commutation states in the transition from dual-coil mode to uni-coil mode is shown in FIG. 16.

In the event that the mode is subsequently reversed from uni-coil back to dual-coil mode, the sequence of operation of the mode control circuit is similar. First, the state on the Q output of the flip-flop 163 on line 166 returns to its original state, reintroducing the delay produced by the delay counter 88 into the commutation timing. Then, the state on the Q output of the flip-flop 164 on line 102 returns to its original state, switching the commutation circuit 81 to operate in dual-coil mode. Again, when the sequencer 81 is switched back to dual-coil mode, the next sequence that is necessary to continue rotation of the rotor (with the 30 degree advance indicated above) is automatically selected. A table showing the relationship of the corresponding commutation states in the transition from uni-coil mode to dual-coil mode is shown in FIG. 17.

The torque changes that are created in the rotor upon switchover from dual-coil to uni-coil mode are shown in the graphs of FIG. 18. FIG. 18A shows the individual torque contributions caused by each coil, and FIG. 18B shows the total resulting torque produced. The angular direction, $\theta$, represents the angular orientation of the pointer 22, seen in FIG. 2.

Similarly, the torque changes that are created in the rotor upon switchover from uni-coil to dual-coil mode are shown in the graphs of FIG. 19. FIG. 19A shows the individual torque contributions caused by each coil, and FIG. 19B shows the total resulting torque produced.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for operating a polyphase dc motor of the type having a plurality of driving coils connected together at a center tap current input node, having a pair of switches arranged for connection in series across the power supply voltage and having a connection node between each switch connected to the center tap, each driving coil having a coil current input node at an end opposite said center tap connection, and a plurality of pairs of switches for connection, each pair being arranged for connection in series across a power supply voltage, each pair having a connection node between each switch of each pair, connected to a respective one of said coil current input nodes comprising;

commutating said plurality of pairs of switches to operate in a dual coil mode during a start-up time; and after the start-up time, selectively commutating said plurality of pairs of switches to operate in a uni-coil mode.

2. The method of claim 1 wherein each of said switches is a MOSFET.

3. The method of claim 1 wherein said polyphase dc motor is a three-phase dc motor.

4. The method of claim 1 wherein said plurality of driving coils comprise a wye connected set of driving coils.

5. The method of claim 1 wherein said motor has a two pole rotor.

6. A method for operating a polyphase dc motor of the type having a plurality of driving coils connected together at a center tap current input node, having a pair of switches arranged for connection in series across the power supply voltage and having a connection node between each switch connected to the center tap, each driving coil having a coil current input node at an end opposite said center tap connection, and a plurality of pairs of switches for connection, each pair being arranged for connection in series across a power supply voltage, each pair having a connection node between each switch of each pair, connected to a respective one of said coil current input nodes comprising;

operating said switches during an initial start-up time to cause a driving current to be passed between sequentially selected pairs of said driving coils in accordance with the following table:

and after start-up, between only single ones of said driving coils and the center tap according to the following table:

|  | Current flows from–to | Floating Coils | uA | 1A | uB | 1B | uC | 1C | uC$_{tap}$ | 1C$_{tap}$ |
|---|---|---|---|---|---|---|---|---|---|---|
| Phase A+ | A–C$_{tap}$ | B&C | ON | OFF | OFF | OFF | OFF | OFF | OFF | ON |
| Phase C– | C$_{tap}$–C | A&B | OFF | OFF | OFF | OFF | OFF | ON | ON | OFF |
| Phase B+ | B–C$_{tap}$ | A&C | OFF | OFF | ON | OFF | OFF | OFF | OFF | ON |
| Phase A– | C$_{tap}$–A | B&C | OFF | ON | OFF | OFF | OFF | OFF | ON | OFF |
| Phase C+ | C–C$_{tap}$ | A&B | OFF | OFF | OFF | OFF | ON | OFF | OFF | ON |
| Phase B– | C$_{tap}$–B | A&C | OFF | OFF | OFF | ON | OFF | OFF | ON | OFF | in which:

the center tap is denoted $C_{tap}$;

each coil is denoted respectively A, B, and C;

each high side switch is denoted respectively uA, uB, uC, uC$_{tap}$;

each low side switch is denoted respectively 1A, 1B, 1C, 1C$_{tap}$;

each phase is denoted (+) if current flows into the designated coil to the center tap and (–) if current flows out of the designated coil from the center tap;

and an open switch is denoted OFF, and a closed switch is denoted "ON".

7. A method for operating a polyphase dc motor of the type having a plurality of driving coils connected together at a center tap current input node, each driving coil having a coil current input node at an end opposite said center tap connection, and a plurality of pairs of switches for connection, each pair being arranged for connection in series across a power supply voltage, each pair having a connection node between each switch of each pair, connected to a respective one of said coil current input nodes comprising;

providing an additional pair of switches arranged for connection in series across the power supply voltage and having a connection node between each switch connected to the center tap;

|  | Current flows from–to | Floating Coils | uA | 1A | uB | 1B | uC | 1C | uC$_{tap}$ | 1C$_{tap}$ |
|---|---|---|---|---|---|---|---|---|---|---|
| Phase 1 | A–B | C | ON | OFF | OFF | ON | OFF | OFF | OFF | OFF |
| Phase 2 | A–C | B | ON | OFF | OFF | OFF | OFF | ON | OFF | OFF |
| Phase 3 | B–C | A | OFF | OFF | ON | OFF | OFF | ON | OFF | OFF |
| Phase 4 | B–A | C | OFF | ON | ON | OFF | OFF | OFF | OFF | OFF |
| Phase 5 | C–A | B | OFF | ON | OFF | OFF | ON | OFF | OFF | OFF |
| Phase 6 | C–B | A | OFF | OFF | OFF | ON | ON | OFF | OFF | OFF | operating said switches to cause a driving current to be passed between sequentially selected pairs of said driving coils for an initial start-up time;

after the initial start-up time, operating said switches to cause a driving current to be passed between sequentially selected only single ones of said driving coils and said center tap current input node; and establishing a predetermined first delay between a zero crossing of a bemf signal of a floating coil and a commutation of driving signals to said coils on the dual-coil mode and establishing a second predetermined delay in uni-coil mode.

8. The apparatus of claim 7 wherein said second predetermined delay is essentially zero.

9. Apparatus for operating a polyphase dc motor of the type having a plurality of driving coils connected together at a center tap, each driving coil having a coil current input node at an end opposite said center tap, and a plurality of switch pairs, each switch pair arranged for connection in series across a power supply voltage, each switch pair having a node between each switch connected to a respective one of said coil current input nodes comprising:

an additional pair of switches arranged for connection in series across the power supply voltage and having a connection node between each switch connected to the center tap;

a sequencing circuit for individually operating said switches during said start-up to cause a driving current to be passed between sequentially selected pairs of said driving coils in accordance with the following table:

driving coils and the center tap according to the following table:

|  | Current flows from–to | Floating Coils | uA | 1A | uB | 1B | uC | 1C | uC$_{tap}$ | 1C$_{tap}$ |
|---|---|---|---|---|---|---|---|---|---|---|
| Phase A+ | A–C$_{tap}$ | B&C | ON | OFF | OFF | OFF | OFF | OFF | OFF | ON |
| Phase C– | C$_{tap}$–C | A&B | OFF | OFF | OFF | OFF | OFF | ON | ON | OFF |
| Phase B+ | B–C$_{tap}$ | A&C | OFF | OFF | ON | OFF | OFF | OFF | OFF | ON |
| Phase A– | C$_{tap}$–A | B&C | OFF | ON | OFF | OFF | OFF | OFF | ON | OFF |
| Phase C+ | C–C$_{tap}$ | A&B | OFF | OFF | OFF | OFF | ON | OFF | OFF | ON |
| Phase B– | C$_{tap}$–B | A&C | OFF | OFF | OFF | ON | OFF | OFF | ON | OFF | in which:

the center tap is denoted C$_{tap}$;

each coil is denoted respectively A, B, and C;

each high side switch is denoted respectively uA, uB, uC, uC$_{tap}$;

each low side switch is denoted respectively 1A, 1B, 1C, 1C$_{tap}$;

each phase is denoted (+) if current flows into the designated coil to the center tap and (–) if current flows out of the designated coil from the center tap;

and an open switch is denoted OFF, and a closed switch is denoted "ON".

10. Apparatus for operating a three-phase polyphase dc motor of the type having a plurality of wye connected driving coils connected together at a center tap, each driving coil having a coil current input node at an end opposite said center tap, and a four pairs of transistor switches for connection in series across a power supply voltage, each pair of transistor switches having a node respectively connected to a respective one of said coil current input nodes and said center tap, comprising:

a switch commutating circuit to operate said switches in a dual-coil mode;

a switch commutating to operate said switches in a uni-coil mode; and.

|  | Current flows from–to | Floating Coils | uA | 1A | uB | 1B | uC | 1C | uC$_{tap}$ | 1C$_{tap}$ |
|---|---|---|---|---|---|---|---|---|---|---|
| Phase 1 | A–B | C | ON | OFF | OFF | ON | OFF | OFF | OFF | OFF |
| Phase 2 | A–C | B | ON | OFF | OFF | OFF | OFF | ON | OFF | OFF |
| Phase 3 | B–C | A | OFF | OFF | ON | OFF | OFF | ON | OFF | OFF |
| Phase 4 | B–A | C | OFF | ON | ON | OFF | OFF | OFF | OFF | OFF |
| Phase 5 | C–A | B | OFF | ON | OFF | OFF | ON | OFF | OFF | OFF |
| Phase 6 | C–B | A | OFF | OFF | OFF | ON | ON | OFF | OFF | OFF | and after start-up, between only single ones of said a circuit to selectively connect one of said switch operating circuits to change between dual-coil mode and uni-coil mode.

11. The apparatus of claim 10 wherein each of said transistors switches is a MOSFET.

12. The apparatus of claim 10 wherein said motor is a sensorless three-phase dc motor.

13. The apparatus of claim 10 wherein said motor has a two pole rotor.

14. The apparatus of claim 10 further comprising a sequencing circuit for individually operating said switches during said start-up to cause a driving current to be passed between sequentially selected pairs of said driving coils and said center tap current input node in accordance with the following table:

|  | Current flows from–to | Floating Coils | uA | 1A | uB | 1B | uC | 1C | uC$_{tap}$ | 1C$_{tap}$ |
|---|---|---|---|---|---|---|---|---|---|---|
| Phase 1 | A–B | C | ON | OFF | OFF | ON | OFF | OFF | OFF | OFF |
| Phase 2 | A–C | B | ON | OFF | OFF | OFF | OFF | ON | OFF | OFF |
| Phase 3 | B–C | A | OFF | OFF | ON | OFF | OFF | ON | OFF | OFF |
| Phase 4 | B–A | C | OFF | ON | ON | OFF | OFF | OFF | OFF | OFF |
| Phase 5 | C–A | B | OFF | ON | OFF | OFF | ON | OFF | OFF | OFF |
| Phase 6 | C–B | A | OFF | OFF | OFF | ON | ON | OFF | OFF | OFF | and after startup, between only single ones of said driving coils and the center tap according to the following table:

|  | Current flows from–to | Floating Coils | uA | 1A | uB | 1B | uC | 1C | uC$_{tap}$ | 1C$_{tap}$ |
|---|---|---|---|---|---|---|---|---|---|---|
| Phase A+ | A–C$_{tap}$ | B&C | ON | OFF | OFF | OFF | OFF | OFF | OFF | ON |
| Phase C– | C$_{tap}$–C | A&B | OFF | OFF | OFF | OFF | OFF | ON | ON | OFF |
| Phase B+ | B–C$_{tap}$ | A&C | OFF | OFF | ON | OFF | OFF | OFF | OFF | ON |
| Phase A– | C$_{tap}$–A | B&C | OFF | ON | OFF | OFF | OFF | OFF | ON | OFF |
| Phase C+ | C–C$_{tap}$ | A&B | OFF | OFF | OFF | OFF | ON | OFF | OFF | ON |
| Phase B– | C$_{tap}$–B | A&C | OFF | OFF | OFF | ON | OFF | OFF | ON | OFF | in which:
the center tap is denoted C$_{tap}$;
each coil is denoted respectively A, B, and C;
each high side switch is denoted respectively uA, uB, uC, UC$_{tap}$;
each low side switch is denoted respectively 1A, 1B, 1C, 1C$_{tap}$;
each phase is denoted (+) if current flows into the designated coil to the center tap and (–) if current flows out of the designated coil from the center tap;
and an open switch is denoted OFF, and a closed switch is denoted "ON".

15. The apparatus of claim 10 further comprising a circuit to select said circuit to operate said switches in a dual-coil mode for an initial start-up time and to select said a circuit to operate said switches after the initial start-up time in a uni-coil mode.

16. The apparatus of claim 10 further comprising a circuit for detecting a zero crossing of a bemf signal of a floating one of the driving coils;

a delay circuit for establishing a delay between a zero crossing and a commutation of driving signals to said coils;

and a circuit for operating said delay circuit to provide a first predetermined delay in dual-coil mode and a second predetermined delay in uni-coil mode.

17. The apparatus of claim 16 wherein said second predetermined delay is essentially zero.

* * * * *